(12) United States Patent
Conley (10) Patent No.: US 8,236,209 B1
(45) Date of Patent: Aug. 7, 2012

(54) METHOD OF MAKING AN ENGRAVED SCANNABLE MARKING CODE

(76) Inventor: Kenneth E. Conley, Matthews, NC (US)

( * ) Notice: Subject to any disclaimer, the term of this patent is extended or adjusted under 35 U.S.C. 154(b) by 1271 days.

(21) Appl. No.: 11/406,145

(22) Filed: Apr. 18, 2006

Related U.S. Application Data (60) Division of application No. 11/103,832, filed on Apr. 12, 2005, now Pat. No. 7,375,891, which is a continuation-in-part of application No. 10/782,226, filed on Feb. 19, 2004, now Pat. No. 6,995,914.

(60) Provisional application No. 60/449,272, filed on Feb. 21, 2003.

(51) Int. Cl.
  *B29D 11/00* (2006.01)

(52) U.S. Cl. .......................................... 264/2.5

(58) Field of Classification Search .................... 264/2.5;
   359/619, 900, 455
   See application file for complete search history.

(56) References Cited

U.S. PATENT DOCUMENTS

| 5,488,451 A * | 1/1996 | Goggins ........................ 355/77 |
| 5,699,190 A * | 12/1997 | Young et al. .................. 359/619 |
| 2003/0214720 A1* | 11/2003 | Bourdelais et al. ........... 359/599 |
| 2006/0152770 A1* | 7/2006 | Keating ....................... 358/3.29 |

* cited by examiner

*Primary Examiner* — Larry Thrower
(74) *Attorney, Agent, or Firm* — Jason S. Miller; Lowndes, Drosdick, Doster, Kantor & Reed, P.A.

(57) ABSTRACT

An engraved scannable marking code produced by providing a substrate of transparent material having a first side and a second side and an index of refraction greater than one; and forming a plurality of lenses on the first side of the substrate in pre-selected portions thereof, wherein the plurality of lenses and selected reminder portions form a desired marking code pattern operable for being read by a code reading apparatus.

20 Claims, 7 Drawing Sheets

METHOD OF MAKING AN ENGRAVED SCANNABLE MARKING CODE

CROSS REFERENCE TO RELATED APPLICATION

This application is a divisional of U.S. patent application Ser. No. 11/103,832, filed on Apr. 12, 2005 now U.S. Pat. No. 7,375,891, which claims the benefit of continuation-in-part of U.S. patent application Ser. No. 10/782,226, filed on Feb. 19, 2004 now U.S. Pat. No. 6,995,914, which claims the benefit of U.S. Provisional Patent Application Ser. No. 60/449,272, filed on Feb. 21, 2003, and is hereby incorporated by reference, and the benefit of priority is hereby claimed.

BACKGROUND OF THE INVENTION

1. Field of the Invention

The present invention generally relates to a manufacturing method for marking code or barcode products, and more particularly, the present invention relates to a manufacturing method for producing engraved sheets having lens arrays located thereon in pre-selected areas, wherein the lens arrays and the remaining portions create a readable marking code or barcode pattern for use in conjunction with present code indicia scanning apparatus.

2. Description of the Related Art

Optical reader-scanner systems are used world wide to track almost all aspects of commerce. The systems operate as data input systems by reading marking codes or barcodes imprinted on packaged items or surfaces. Such systems are, for example, being used in businesses for inventory control, retail sales, shipping information, product tracking, etc. There are currently several encodation systems used in modern barcode symbology design i.e., "Binary" encoding and ("n,k") encoding. Each have their advantages and disadvantages. Generally speaking, (n,k) encoding is more space efficient, whereas Binary encoding is more tolerant of printing imperfections. Further, there are many types of barcode schemes known and used for encoding machine—readable information in accordance with existing standards. For example, existing schemes include, but are not limited to, Code 128, EAN 128, Codabar, the EAN 8 and 13 series, the ISBN series, the ISSN series, ITF, the JAN 8 and 13 series, Pharmacode, the UPC-A and -E series, Plessy and code 39.

Generally, all the above systems function in a similar manner. For purposes of example only and referring now to FIG. 1, the most commonly used barcode symbology in the United States, the UPC-A barcode scheme, is shown. The UPC-A symbol 100 encodes eleven digits 110 of numeric (0 through 9) message data along with a trailing check digit 112, for a total of twelve digits of barcode data. In addition, there are human readable digits 114 printed within the barcode 100. Generally, the UPC-A barcode 100 is divided into seven areas: left guard pattern 116, the number system 118, the manufacturer code 120, the center guard pattern 122, the product code 124, the check digit 112, and the right guard pattern 126. Typically, the number system digit 118 is printed on the left of the barcode 100, the check digit 112 is printed on the right, and the manufacturer code 120 and product code 124 are printed intermediate the number system digit 118 and the check digit 112. Although the UPC-A symbol 100 is continuous, the left and right halves, divided by the center guard 122, can be independently decoded.

Figure 1:
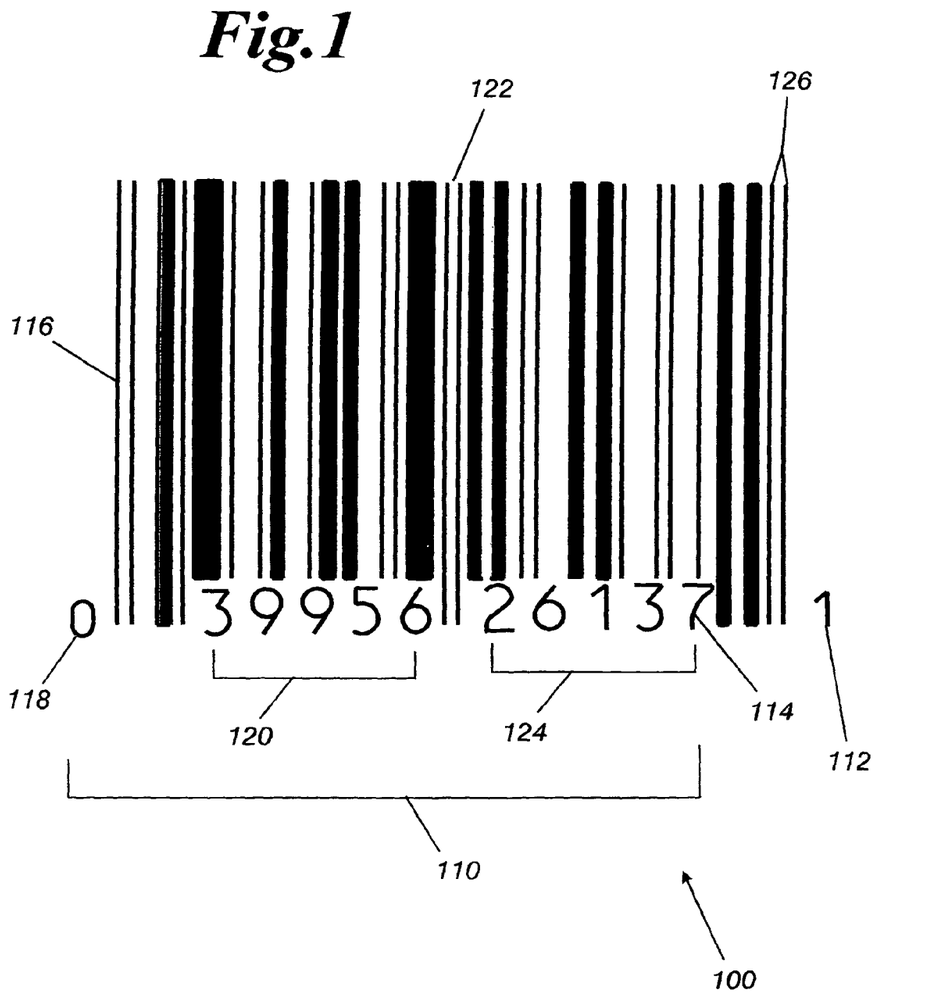
FIG. 1 is a perspective view of an exemplary UPC-A barcode symbol used in accordance with the present invention.

Digits used in the barcode 100 are coded as a sequence of two bars and two spaces within a space seven modules wide. Bar and space widths may be 1, 2, 3, or 4 modules wide. This results in twenty possible bar-space combinations. Ten of these patterns are used for left odd party digits and ten are used for right even parity digits. The left digits always start with a space, while the right digits always start with a bar. Table 1 illustrates the bar space combination for the associated numbers.

TABLE 1

|   | Left Digits<br>Odd Parity<br>S B S B | Right Digits<br>Even Parity<br>B S B S |
|---|---|---|
| 0 | 3 2 1 1 | 3 2 1 1 |
| 1 | 2 2 2 1 | 2 2 2 1 |
| 2 | 2 1 2 2 | 2 1 2 2 |
| 3 | 1 4 1 1 | 1 4 1 1 |
| 4 | 1 1 3 2 | 1 1 3 2 |
| 5 | 1 2 3 1 | 1 2 3 1 |
| 6 | 1 1 1 4 | 1 1 1 4 |
| 7 | 1 3 1 2 | 1 3 1 2 |
| 8 | 1 2 1 3 | 1 2 1 3 |
| 9 | 3 1 1 2 | 3 1 1 2 |

The left guard pattern 116, the center guard pattern 122 and the right guard pattern 126 consist of two vertical lines, a bit taller or larger than the other bars. They do not, however, contribute to the actual code 100. Rather, they serve as an indicator of division for the code indicia.

The number system digit 118 is a single digit that identifies the type of product that the symbol 100 represents. Table 2 indicates the various number systems and their uses:

TABLE 2

| Number System | Description |
|---|---|
| 0 | Regular UPC codes |
| 1 | Reserved |
| 2 | Weight items marked at a store |
| 3 | National Drug/Health related code |
| 4 | No format restrictions, in store on non-food items |
| 5 | Coupons |
| 6 | Reserved |
| 7 | Regular UPC codes |
| 8 | Reserved |
| 9 | Reserved |

The manufacturer code 120 consists of five numbers (and corresponding bars) that identifies the product's manufacturer. The product code 124, like the manufacturer code 120, consists of five numbers (and corresponding bars) to identify the product. Finally, the check digit 112 is a single digit used to verify the barcode 100 when it is scanned by a code reading apparatus (not shown). The check digit 112 is value based on a weighting of the other digits in the code 100. To determine the value of the check digit 112, the following procedure is used:

$$3*(\Sigma \text{ digits in even positions}) + (\Sigma \text{ digits in odd positions}) = \text{multiple of } 10$$

By way of example, in a UPC-A barcode number "03600029145X" where X is the check digit, X is calculated by adding the odd-numbered digits (0+6+0+2+1+5=14), multiplying by three (14*3=42), adding the even numbered digits (42+3+0+0+9+4=58) and subtracting from the next-higher multiple of 10 (60−58=2). The check digit 112 is thus two.

In order to scan the barcodes, various physical devices may be employed. In some case a fixed scanner is used, wherein the product is passed over the scanner. In others, a handheld scanner is passed over the code thereby reading the same. In either case, a low powered scanning laser, such as a helium-neon laser, provides a coherent beam of monochromatic light. The use of this type of light source provides the high level signal-to-noise ration necessary for processing that is unavailable from other sources. The light beam is directed to a scanner mechanism which generates an optical scan pattern at a window in, for example, a check-out counter. One example of such an optical reader-scanner system is disclosed in U.S. Pat. No. 4,056,710 entitled System For Decoding Barcode to Shepardson et al.

The actual identification of the barcode symbol is made by electronically analyzing the signals generated by the light beam that is reflected back from the package surface to an optical detector. The output of the detector then goes to electronic circuitry and is continuously analyzed for the symbol coded content.

When the high speed movement of the light beam crosses the light and dark bars of a symbol code, a specific pulse train waveform is generated. The characteristics of this waveform are established by the width of the individual light and dark bars and by the speed of the sweep. If the electronic circuitry determines that the symbol is valid and positive identification of the symbol is made, the signal is passed onto a controller of the system. This output signal provides the address for the memory bank location where the instructions for billing and receipt recording of that symbol are stored.

If the symbol is not valid, i.e., has been tampered with, altered, damaged, or is simply not readable due to print quality, etc., the positive identification cannot be made and a no-reading visual or audio alarm is typically sounded. This notifies the user that a visual identification and a manual entry must be made.

Prior art teaches that existing UPC symbol codes are manufactured to be scanned by the above described physical devices by printing dark bars on a white, reflective background, such as paper or other suitable substrate, with marking means such as inks of a black color or some other dull color. Historically, this necessitated the use of white labels having black indicia printed thereon, with said labels being attached to the wrapping or container of the associated commercial product. As the use of such a label can be unsightly and detract from the overall appeal of a packaged product, other methods of using barcodes are desired. Further, while it is desirable for every barcode to be printed to exacting specifications in order to allow for a maximum tolerance of noise and other distortions during the scanning process, in practice the printing process can introduce a variety of imperfections, many of these resulting from imperfections in the paper (or other substrate) that the barcode is printed upon. These substrate imperfections, such as bleeding, ink spread and the like, may introduce random errors in the positions of the edges that separate dark bars from light spaces within the barcode, thereby resulting in erroneous marking codes.

If the wrapping or container of a product provided has a suitable reflective background, however, the black code indicia could be printed directly on the wrapping or container. The printing has the same resulting imperfections as noted above. Further, this method requires multiple printing stations if the trade-dress and/or printed designs were not in black. More specifically, a printing system is required which includes one or more stations for imprinting the colored trade dress designs and at least one additional station for imprinting the coded material in black. Moreover, the black code still detracts from the overall aesthetic quality of the finished product.

Accordingly, industry has strived to blend code indicia such as UPC indicia into the trade dress and/or packaging of an item to thereby enhance the aesthetic quality of the packaged product or item, but to as well avoid the need for additional printing stations. For example, one method is discussed in U.S. Pat. No. 3,933,094 entitled Substrate Having Colored Indicia Thereon For Read-out By Infrared Scanning Apparatus to Murphy et al. which discloses the addition of certain metallic compounds to colored inks in order to effect the desired improvements in the infrared absorption characteristics of the ink. Thus, when code indicia are printed with colored inks on a reflective background, a sufficient contrast in reflectance is obtained so that the code can be successfully read. A problem arises, however, when the package does not provide a suitable reflective background of sufficient size on which to print the symbol. In such instances, the return to using labels imprinted with the symbol has been necessary, with its aesthetic disadvantages.

Additionally, a printing of the desired barcode in a negative mode has been attempted where the trade dress is of a white reflective color and the background provided by the item offers little reflectance. By "negative mode" is meant that the actual printed indicia act as the reflective background of the code symbol and the spaces or voids between the printed indicia, which show the absorptive background, are the non-reflective or absorptive portion of the code symbol. Disadvantageously, ones trade dress color is not always reflective in the appropriate wavelength region. In particular, the afore-discussed technique cannot be used when the trade dress color is red, a color which is not capable of being read by conventional scanning apparatus. Finally, as more packages are being wrapped in plastic film for improved aesthetics, such as barrier properties and safety in packaging, it is increasingly difficult to read the bar code through the plastic film.

It is therefore apparent, that there exists a need in the art for a manufacturing method which produces engraved marking codes without the necessity of labels comprising printed ink. Further, there is a need in the art for a manufacturing method for producing engraved sheets having lens arrays located thereon in pre-selected areas, wherein the lens arrays and the remaining portions thereof create a readable marking code pattern for use in conjunction with present code indicia scanning apparatus.

BRIEF SUMMARY OF THE INVENTION

To achieve the foregoing and other objects, and in accordance with the purposes of the invention as embodied and broadly described herein, the present invention provides various embodiments of a manufacturing method for engraved sheet products having marking codes thereon, and more particularly, the present invention relates to a manufacturing method for producing engraved sheets having lens arrays located thereon in pre-selected areas, wherein the lens arrays and the remaining portions create a readable marking code pattern for use in conjunction with present code indicia scanning apparatus. In various embodiments, the present invention provides cylinders or pressing sheets operable for engraving or stamping either thick rigid sheets or thin, flexible webs having a variety of lens shapes in the form of marking codes or barcodes for use with commercial products and/or the like. The present invention provides significant advantages over the prior art by providing engraved scannable marking/barcodes, thereby eliminating the disadvantages of the prior art printed ink methods.

In various embodiments, the present invention provides a method for inverse engraving a marking code pattern into a cylinder operable for producing embossed sheets and/or films that accurately has the marking code pattern thereon such that the resulting sheet or film can be scanned by conventional scanning apparatus and be used with commercial products including labels, packaging, boxes, bags and/or the like without the shortcomings of the prior art.

The method described herein is useful in the production of marking codes that do not rely on printed ink of various colors. The present invention relies on a combination of light reflectivity lens arrays versus light scatter or light diffraction lens arrays which can be used in a code symbol to be processed by a visible or infrared code indicia scanning system.

The present invention also provides a method in which a marking code symbol can be engraved into a cylinder or plate for transferring the pattern to a plastic film or sheet or coating on a label or packaging media. The product is then placed on or used to label commercial package items that rely on a barcode reader for tracking, inventory control and sales information. The present invention also provides a method of producing a barcode which offers security not heretofore available in a printed barcode. The engraved barcode is difficult to reproduce, easy to identify and verify its authenticity. Additional advantages and novelty of the present invention are a clear film with a barcode pattern thereon which can be placed over printed text such as instructions, advertisements or other messages; and read visually while the bar code reader reads the engraved code on the surface. The engraved barcode of the present invention also gives line straightness, accuracy and resolution not available with prior art printed barcodes. There is no feathering of the edges or fading as found in the prior art.

According to one exemplary embodiment, a sheet having lens arrays thereon in pre-selected areas forming a desired marking or barcode is produced by the steps of first manufacturing a cutting tool such as a diamond stylus or other similar tool made from a carbide or other hard material. This step is performed by first shaping the material. The cutting tool is then used to engrave a pre-selected lens pattern, or array, into a metal cylinder or plate at the desired lens repeat in the desired areas. The engraving of the cylinder or plate is performed in any known conventional manner of engraving. However, it is preferable that a computer is utilized for directing the manner and depth of the cutting tool as it engraves the cylinder or plate with the desired marking code pattern. The barcode lens pattern, as engraved into the cylinder, is then polished to achieve an optimal surface. Thereafter, the lens pattern is transferred to a desired side of a flexible, transparent plastic sheet at a pre-selected area by using an extrusion nip when the sheet is formed or at an embossing nip with a performed and heated plastic sheet, or by casting if made from an ultra violet, light curing resin or with other curable resins.

According to another exemplary embodiment, a barcode lens array pattern is engraved into and across the entirety of a plate or cylinder. The plate or cylinder is then provided with a pre-mask that is placed in certain areas where it is desirable to keep and protect the lenses. The pre-mask is made of a dielectric material whose function is to prevent plating from taking place in this area. The plate or cylinder is then electroplated with a metal such as copper. The electroplated metal is applied such that it builds up to a level higher that the lenticules under the pre-mask area. The pre-mask is then removed and the electroplated metal is cut back to a desired level. Thereafter, the barcode pattern is transferred to a desired side of a flexible, transparent plastic sheet at a pre-selected area by using an extrusion nip when the sheet is formed or at an embossing nip with a preformed and heated plastic sheet, or by casting if made from an ultra violet light curing resin or with other curable resins.

According to another exemplary embodiment, a barcode array pattern is engraved into and across the entirety of a plate or cylinder. Subsequent to the engraving of the plate or cylinder, the plate or cylinder is placed in a gravure engraving machine operable for removing portions of the cylinder under computer direction and controls. Desired portions or lenticules of the array are removed, thereby creating the desired marking code pattern. Thereafter, the lens pattern is transferred to a desired side of a flexible, transparent plastic sheet at a pre-selected area by using an extrusion nip when the sheet is formed or at an embossing nip with a performed and heated plastic sheet, or by casting if made from an ultra violet light curing resin or with other curable resins.

According to another exemplary embodiment, a method of manufacturing a sheet having a desired barcode or marking pattern comprises the steps of producing a transparent sheet by engraving a desired lens pattern into a flat metal plate or into and over an entire cylinder wherein the surface metal of the plate or cylinder in which the pattern is engraved into is loosely bonded to the base thereof and can be removed to become an engraved metal shell. Thereafter, the engraved metal shell is cut to the desired shape and turned in the desired direction of which the lenses are to run on the final transparent patterned sheet. The metal shell is then fastened to the cylinder or plate to be used to produce the transparent patterned sheet. Thereafter, the lens pattern is transferred to a desired side of a flexible, transparent plastic sheet at a pre-selected area by using an extrusion nip when the sheet is formed or at an embossing nip with a preformed and heated plastic sheet, or by casting if made from an ultra violet light curing resin or with other curable resins

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE INVENTION

The present invention will now be described more fully hereinafter with reference to the accompanying drawings in which exemplary embodiments of the invention are shown. However, this invention may be embodied in many different forms and should not be construed as limited to the embodiments set forth herein. These exemplary embodiments are provided so that this disclosure will be both thorough and complete, and will fully convey the scope of the invention to those skilled in the art. Like reference numbers refer to like elements throughout the various drawings.

The present invention provides various embodiments of a method for producing an engraved sheet having lens arrays located in pre-selected areas forming a marking/bar code. It will be understood by those skilled in the art that the term "marking code" or "barcode" is intended to mean a series of parallel vertical lines, or bars, used to assign a unique identification code to an item. In the barcode, a number or character is represented in binary form by a short sequence of alternating black and white bars (or lens and spaces) of varying widths. A barcode combines several of these sequences to create a unique set of numbers or characters that identifies an associated item.

The various embodiments of the present invention may be applied in any known manufacturing system. However, throughout this specification and for exemplary purposes only, a lenticular manufacturing system shall be described. As is well known and understood in the art, lenticular lens material utilizes rows of simple and commonly dome-shaped lenses or "lenticules. It will be understood by those skilled in the art that any lens element may be used in accordance with the present invention either singularly or in combination such as, and without limitation, lineal fresnel, dot or prismatic. As used herein, the term "lenticular sheet" is intended to include any optical sheet, roll, film or material that is suitable for use in the printing arts and has a substantially transparent quality. Material compositions of such sheets may include, for example and without limitation, polypropylene, polyester, polyethylene, polyvinylchloride, and polystyrene. All such compositions are considered to be polymeric sheet materials and are synonymous therewith. In one example, the lenticular sheet generally comprises a flat side and a lenticulated side including the lenticules.

Figure 2:
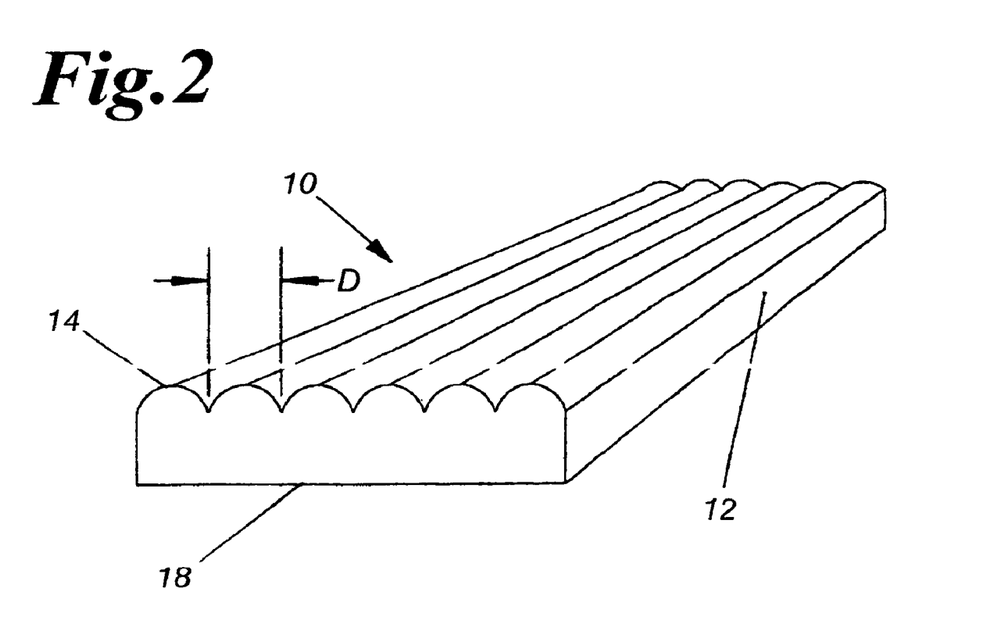
FIG. 2 is a perspective view of a portion of a known lenticular array useful in the production of the engraved marking code of the present invention.
Figure 3:
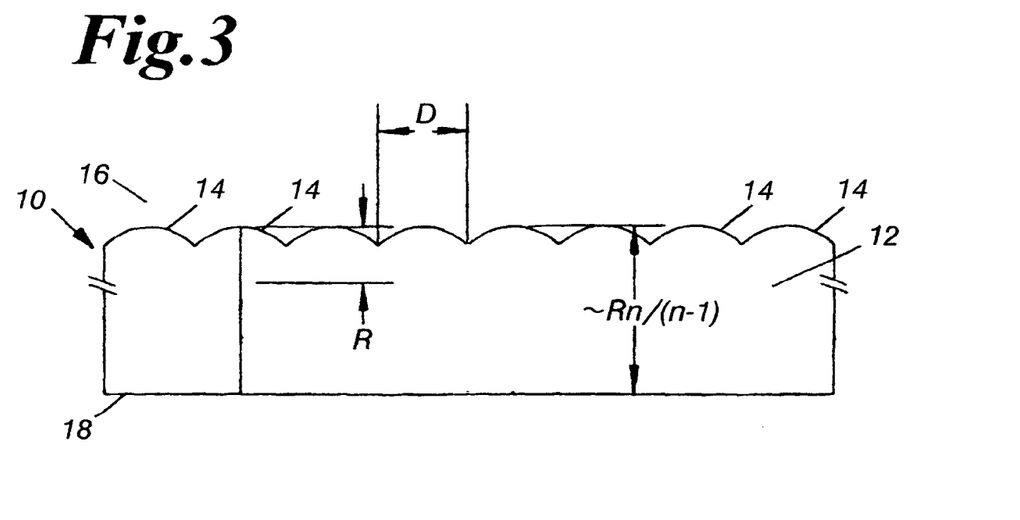
FIG. 3 is a cross-sectional view of the lenticular array shown in FIG. 2.

Referring now to the drawings, FIG. 2 is a perspective view of a portion of a known lenticular array 10. The array 10 has lens elements 14 that are cylindrical lenses with a circular cross section. The width of each lens is D. The lenticular array consists of a dielectric medium 12 with multiple convex lenses 14 formed on a viewer/scanning side. The dielectric medium 12 may be any transparent material, but is typically a clear plastic having good mechanical properties. The shape of the lens elements are such that light is deflected or reflected at various angles. FIG. 3 is a cross-sectional view of the lenticular array 10 shown in FIG. 2. The array 10 comprises a sheet of material with dimensions MD×ND×~nR/(n−1) where D is the width of a lens element 14 as best shown in FIG. 3, n is the index of refraction of the plastic material, R is the radius of the lens element 14 and R<D/2. M and N are product variables.

The transparent material is commonly formed as a sheet with a lens array formed on the front side 16, or a viewer/scannable side. The backside 18, or flat side, is considered a non-viewer/scannable side. The radius of the substantially circular cross section, R, is shown larger than the lens spacing D. The overall thickness of the array is:

$$\text{Thickness} \sim R \times n/(n-1)$$

Where n is an index of refraction for the dielectric medium.

Figure 4:
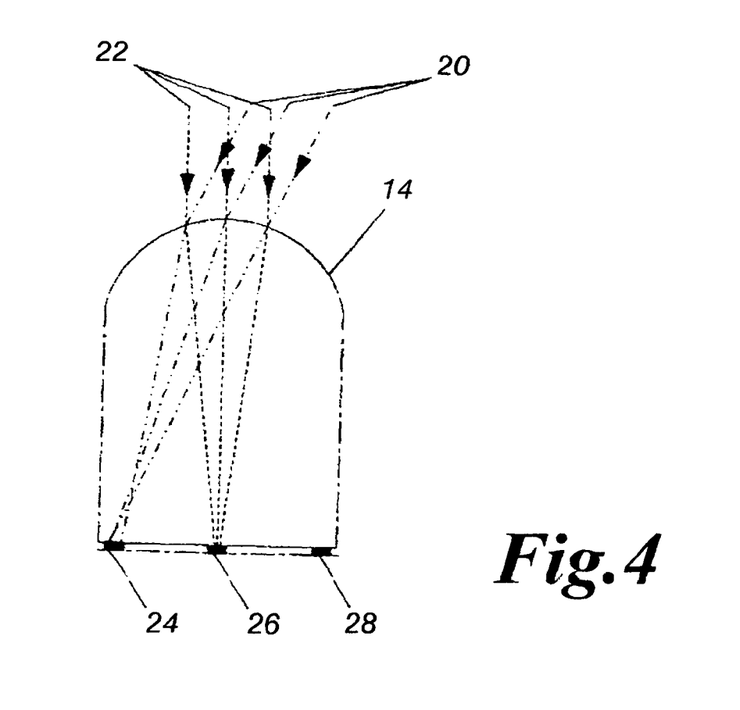
FIG. 4 is a cross-sectional view of a lens element of the lenticular array shown in FIG. 2.

FIG. 4 is a cross-sectional view of the lens element 14 of the lenticular array 10 shown in FIG. 2. An individual lens can be analyzed or scanned with negligible error by assuming that light rays at a first angle 20 and light rays at a second angle 22 are parallel. The lens 14 focuses the rays from a repertoire of angles onto a repertoire of regions on the flat side. The light rays from the first angle 20 focus on a region 24. From symmetry, light rays at an angle that is negative with respect to a perpendicular to the array 10, if the angle 20 is defined as positive, focus on an area 28 that is mirrored from the centerline of the lens 14. Light rays from the second angle 22 focuses on and therefore select a second, independent area 26. If the repertoire of regions has a defined number, the lens 14 must be capable of adequately focusing on a same number of independent areas. The actual repertoire of angles need not be a linear progression. A measure of the quality of a lens is the standard deviation of a point from a spread of points that intersect the lens. If the standard deviation is such that focus areas overrun adjacent focus areas, the regions scanned will not be well defined in color and especially definition. Thus, errors may be produced.

In accordance with one exemplary embodiment of the present invention, the barcode lens arrays used in the engraved sheet are fabricated by first designing a cutting tool, such as a stylus, with a desired lens shape. The cutting tool is preferably made of a diamond or carbide, however, it will be understood by those skilled in the art that any hard material suitable for engraving cylinders may be used. The shape of the cutting tool is dictated by the desired visual effect.

Once the cutting tool is designed, the desired inverse lens shape of the marking code is engraved into pre-selected portions of a flat plate or cylinder using any known, conventional method of engraving, thereby forming a plurality of inverse lens arrays or patterns. Preferably, the cylinder is placed in an engraving or CNC turning lathe which can accurately guide an engraving head, the cutting tool, across the surface of the cylinder. More preferably, the engraving processing includes the use of a programmable computer operable for directing the cutting action and placement of the cutting tool in both direction and depth such that bands of optimal lens patterns are transferred into the plate or cylinder which are areas where light from a scanning device will be deflected or reflected in a different direction from smooth adjacent unengraved areas on the cylinder, or simply to scatter light. Each of the engraved bands of lenses can be just one cut or a series of engravings consisting of a frequency of up to 2000 cuts per inch or more. The width of each band and each adjacent smooth area is determined by the desired barcode allocation.

As previously discussed, the shape of the engraving on each band of lens elements can be prismatic, lineal fresnel, lenticular or dot or any combination there of. If the lens pattern is to be a dot repeating type of pattern, a vibrating tool holder is used. The shape of the engraving can be different on adjacent bands of lens elements, or different within the same band. This differentiation is useful where security of the code exists and a desire to not have it reproduced is present. For additional security, trace elements, pigments, dyes, etc., can be added to the film or resin formulation. Confirmation of the authenticity and accuracy of the engraving is confirmed by microscope examination or/and with scanning equipment capable of analyzing the waveform emanating from the scanned barcode pattern. Advantageously, by using the engraving process for the plate or cylinder, a variety of inverse lens patterns can be engraved into the plate or cylinder, thereby providing a variety of barcode lens patterns embossed on the same sheet, including but without limitation, lens patterns having different shapes and lens patterns extending in different directions such as longitudinally and latitudinally from a certain axis.

Subsequent to engraving the plate or cylinder, the cylinder is placed into the lenticular system or process of manufacture. The inverse barcode lens pattern is then transferred to a sheet material using known conventional extrusion embossment methods, thereby forming the lens pattern on the sheet in the desired areas only. Preferably, the sheet material is plastic. Further, it will be appreciated by those skilled in the art, that a variety of plastics can be employed, for example and without limitation, acrylics, polystyrenes, polycarbonates, polyesters, polyolefin's, polyvinyl chlorides and all such polymeric equivalent materials.

By using the above described method of manufacture, an engraved marking code is produced which is operable for use with conventional scanning apparatus. Further, the requirement of using printed inks on reflective backgrounds and the shortcoming associated therewith are eliminated due to the lens arrays ability to reflect or deflect the light emanated from the scanner. Further yet, the disclosed method produces a marking code which uses a clear film such that the marking code can be positioned over printed text, allowing said text to be visually read while contemporaneously scanning the code. Finally, the disclosed method provides line straightness, accuracy, resolution and security not heretofore available in prior art marking codes.

A sample barcode was made by using the above describe method. Sample A was created in accordance with the present invention and for purposes of example only. Sample A was prepared for a barcode having the following number: "80025 75540". The lenticular barcode array was made in the order of 50×=0.0008"/unit. The cylinder was prepared and placed within a lenticular turning machine wherein a computer was programmed to have the cutting tool, a diamond stylus, make engravings, or cuts, shown in Table 3.

TABLE 3

|  | Units | Thickness in inches | Color: b = Black w = White |
|---|---|---|---|
| 1 | 26 | .0208 | b |
| 2 | 15 | .0120 | w |
| 3 | 12 | .0096 | b |
| 4 | 9 | .0072 | w |
| 5 | 33 | .0264 | b |
| 6 | 9 | .0072 | w |
| 7 | 33 | .0264 | b |
| 8 | 9 | .0072 | w |
| 9 | 12 | .0096 | b |
| 10 | 9 | .0072 | w |
| 11 | 11 | .0088 | b |
| 12 | 9 | .0072 | w |
| 13 | 12 | .0096 | b |
| 14 | 30 | .0240 | w |
| 15 | 33 | .0264 | b |
| 16 | 9 | .0072 | w |
| 17 | 12 | .0096 | b |
| 18 | 9 | .0072 | w |
| 19 | 33 | .0264 | b |
| 20 | 9 | .0072 | w |
| 21 | 33 | .0264 | b |
| 22 | 9 | .0072 | w |
| 23 | 12 | .0096 | b |
| 24 | 29 | .0232 | w |
| 25 | 12 | .0096 | b |
| 26 | 10 | .0080 | w |
| 27 | 11 | .0088 | b |
| 28 | 10 | .0080 | w |
| 29 | 32 | .0256 | b |
| 30 | 10 | .0080 | w |
| 31 | 32 | .0256 | b |
| 32 | 10 | .0080 | w |
| 33 | 32 | .0256 | b |
| 34 | 9 | .0072 | w |
| 35 | 12 | .0096 | b |
| 36 | 12 | .0096 | w |
| 37 | 13 | .0104 | b |
| 38 | 12 | .0096 | w |
| 39 | 13 | .0104 | b |
| 40 | 22 | .0176 | w |
| 41 | 32 | .0256 | b |
| 42 | 10 | .0080 | w |
| 43 | 32 | .0256 | b |
| 44 | 34 | .0272 | w |
| 45 | 12 | .0096 | b |
| 46 | 9 | .0072 | w |
| 47 | 12 | .0096 | b |
| 48 | 9 | .0072 | w |
| 49 | 11 | .0088 | b |
| 50 | 9 | .0072 | w |
| 51 | 32 | .0256 | b |
| 52 | 10 | .0080 | w |
| 53 | 33 | .0264 | b |
| 54 | 19 | .0152 | w |
| 55 | 32 | .0256 | b |
| 56 | 10 | .0080 | w |
| 57 | 11 | .0088 | b |
| 58 | 29 | .0232 | w |
| 59 | 12 | .0096 | b |
| 60 | 10 | .0080 | w |
| 61 | 11 | .0088 | b |
| 62 | 10 | .0080 | w |
| 63 | 32 | .0256 | b |
| 64 | 10 | .0080 | w |
| 65 | 32 | .0256 | b |
| 66 | 10 | .0080 | w |
| 67 | 12 | .0096 | b |
| 68 | 29 | .0232 | w |
| 69 | 12 | .0096 | b |
| 70 | 9 | .0072 | w |
| 71 | 11 | .0088 | b |
| 72 | 9 | .0072 | w |
| 73 | 32 | .0256 | b |
| 74 | 10 | .0080 | w |
| 75 | 12 | .0096 | b |
| 76 | 50 | .0400 | w |
| 77 | 32 | .0256 | b |
| 78 | 10 | .0080 | w |
| 79 | 32 | .0256 | b |
| 80 | 9 | .0072 | w |
| 81 | 12 | .0096 | b |

The resulting engraved barcode was capable of being scanned by a conventional scanning apparatus yielding the proper barcode number. No ink or other pigmentation was used to facilitate the scanning process.

Figure 5:
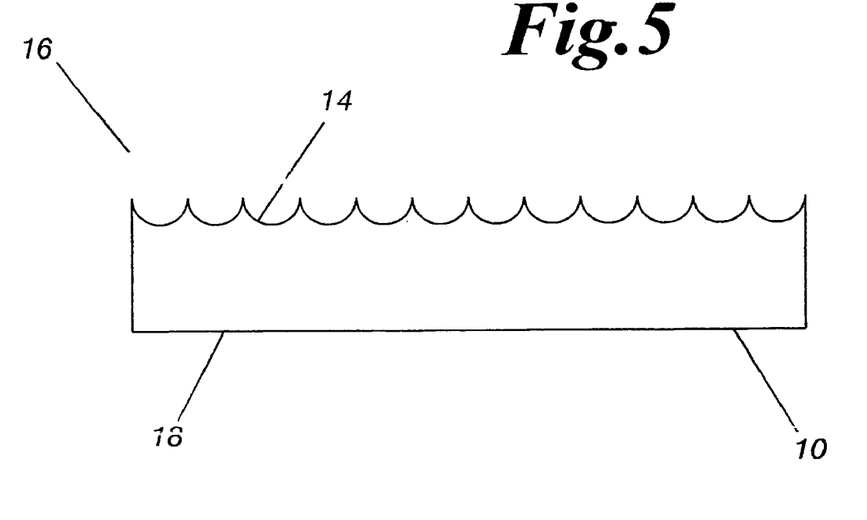
FIG. 5 is a cross-sectional view of an engraved cylinder or plate with a lenticular pattern used in the production of an exemplary embodiment of the present invention.
Figure 6:
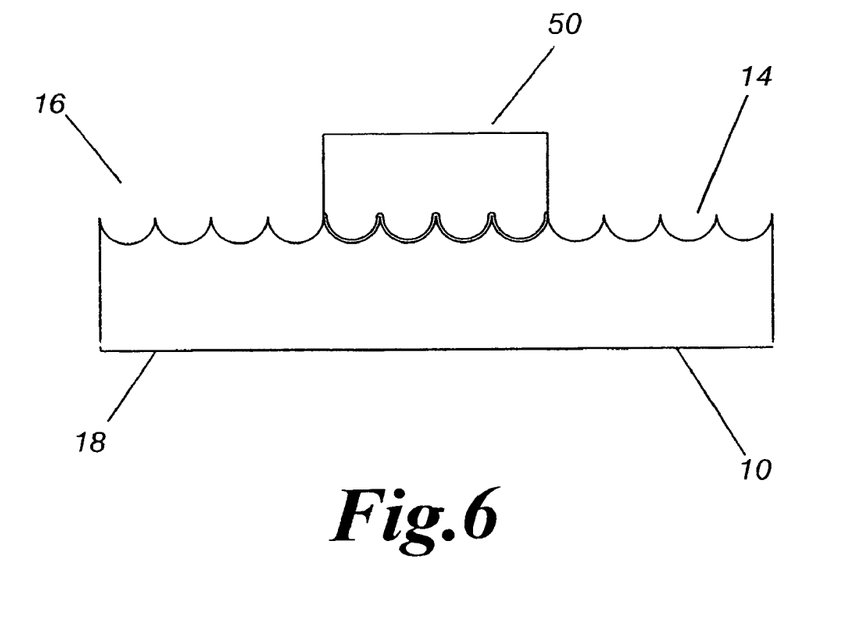
FIG. 6 is a cross-sectional view of the engraved lenticular pattern of FIG. 5 with a mask placed over the lenticules desired to be kept.
Figure 7:
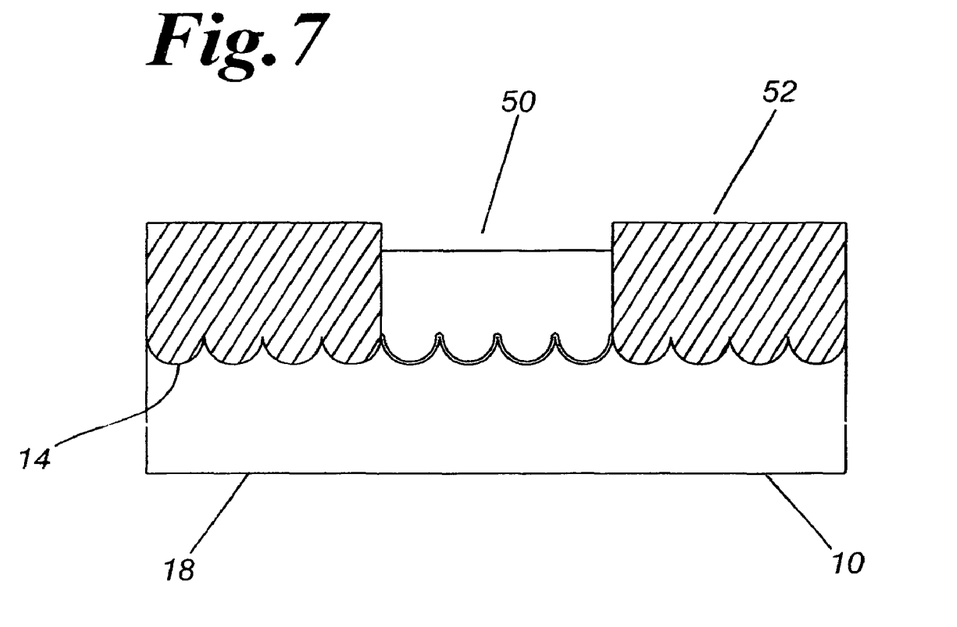
FIG. 7 is a cross-sectional view of the engraved lenticular pattern of FIG. 5 with a mask and with electroplating in the areas not desired to be kept.
Figure 8:
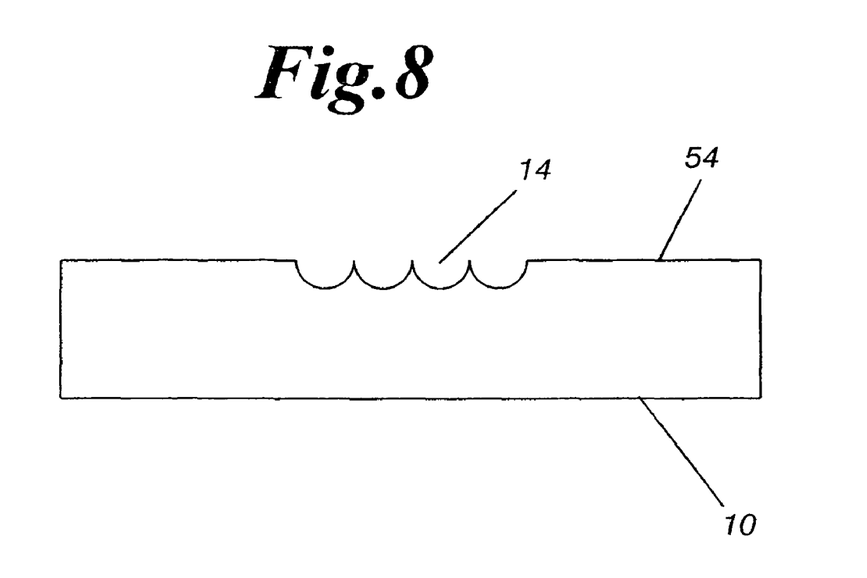
FIG. 8 is a cross-sectional view of the engraved lenticular pattern of FIG. 5 with the mask removed and the electroplating cut back to the desired level and polished, leaving lenticules in desired areas.

Referring now to FIG. 5, a lens constructed in accordance with an alternative method of the present invention is disclosed. As seen, FIG. 5 is a cross sectional view of a portion of a lenticular array 10 as would be engraved into and across a plate or cylinder. This plate or cylinder could be used to produce the barcode lens pattern of FIG. 1. FIG. 6 depicts a cross sectional view of a portion of the lenticular array 10 with a pre-mask 50 placed in certain areas on the engraved plate or cylinder where it is desirable to keep and protect the lenses 14 from being electroplated by a metal such as copper. This pre-mask 50 is pre-shaped to a desired shape, for example, a marking code similar to the symbol shown in FIG. 1 and attached to the desired area. The pre-mask 50 is made of a dielectric material whose function is to prevent plating from taking place in this area. FIG. 7 is a cross sectional view of a portion of the lenticular array 10 with a pre-mask 50 placed in certain areas on the engraved plate or cylinder where it is desirable to keep and protect the lenses 14 from the electroplated metal 52. The electroplated metal 52 is provided and builds up to a level higher that the lenticules 14 under the pre-mask area 50. FIG. 8 is a cross sectional view of a portion of the lenticular array 10 with the pre-mask 50 removed from the lenses 14 and showing the electroplated metal 52 cut back to a desired level 54. Thereafter, the lens pattern is transferred to a desired side of a flexible, transparent plastic sheet at a pre-selected area by using an extrusion nip when the sheet is formed or at an embossing nip with a preformed and heated plastic sheet, or by casting if made from an ultra violet light curing resin or with other curable resins.

According to another exemplary embodiment, a lenticular array is engraved into and across the entirety of a plate or cylinder. Subsequent to the engraving of the plate or cylinder, the plate or cylinder is placed in a gravure engraving machine operable for removing portions of the cylinder under computer direction and controls. Desired portions or lenticules are removed. Thereafter, the lens pattern is transferred to a desired side of a flexible, transparent plastic sheet at a pre-selected area by using an extrusion nip when the sheet is formed or at an embossing nip with a preformed and heated plastic sheet, or by casting if made from an ultra violet light curing resin or with other curable resins.

Figure 9:
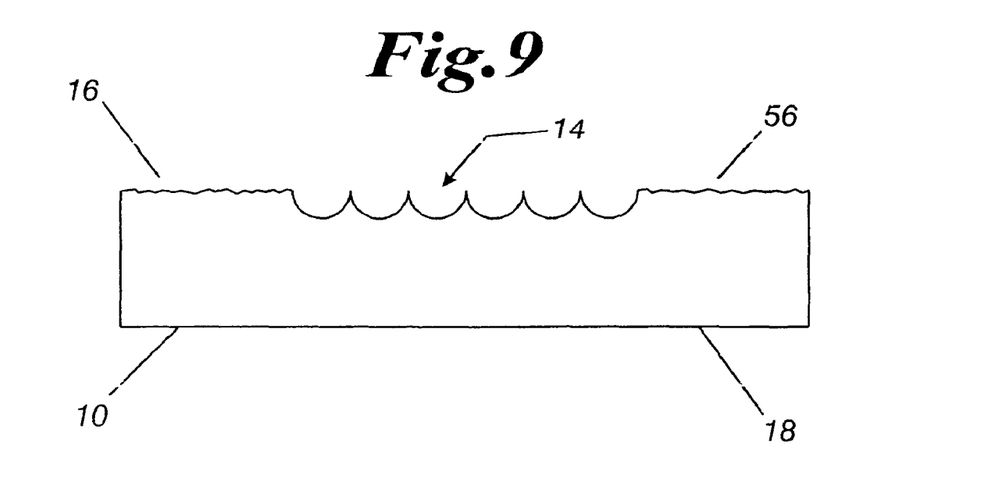
FIG. 9 is a surface view of the finished plate showing lenticules in the desired areas in accordance with another exemplary embodiment of the present invention.
Figure 10:
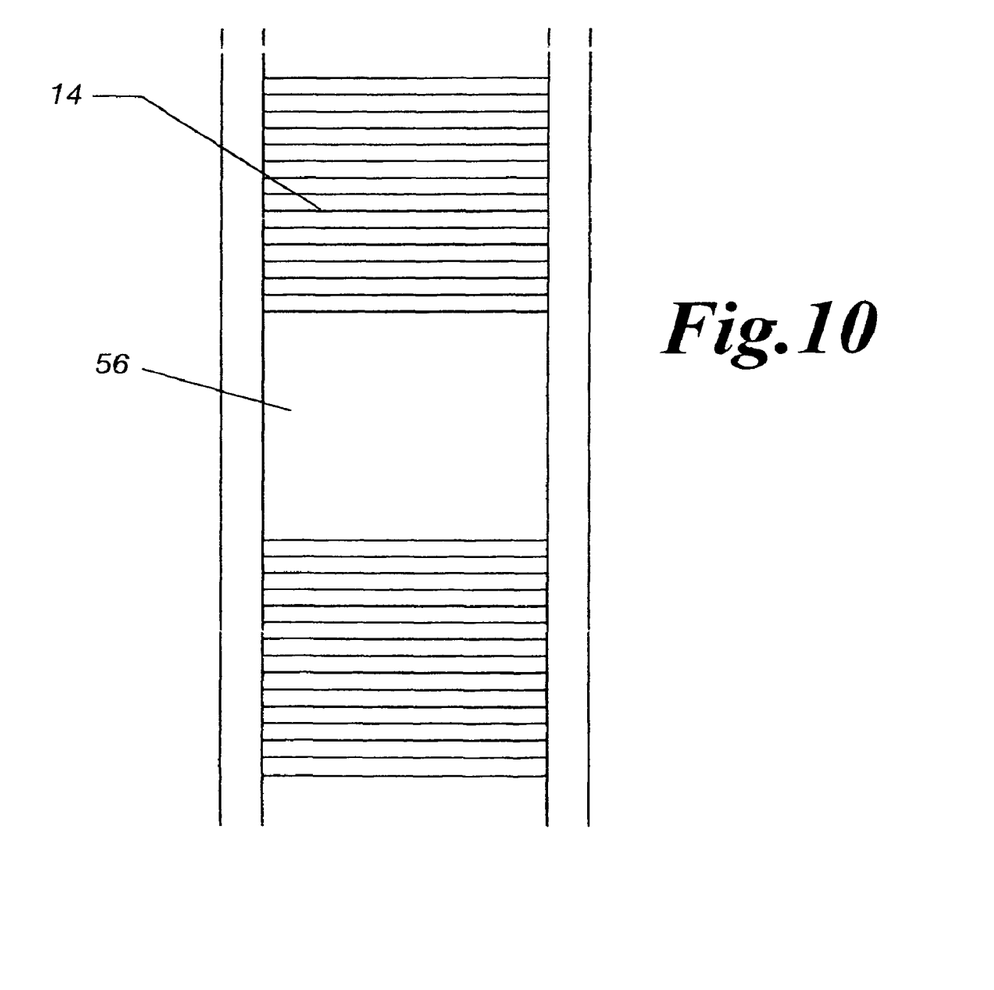
FIG. 10 is a surface view of a continuous web with lenses in selected areas and engraved across the cylinder.

FIG. 9 is a cross sectional view of a portion of the lenticular array 10 with the lenses 14 and the cut back portions 56. FIG. 10 is a cross sectional view of a portion of the lenticular array 10 produced in accordance with the present method wherein the lenses 14 are removed in certain areas 56 on the engraved plate or cylinder by a diamond stylus or cutting tool on a gravure engraving machine, while leaving the lenses 14 in the desired areas of the engraved plate. By using a gravure engraving machine, it is not necessary to pre-mask the areas desired to be left with a lenticular pattern. The diamond stylus used to remove the lenses in the unwanted areas is pre-determined and computer controlled. Therefore, the pattern can be generated by the computer as is done when engraving print patterns. The lens area 14 will be higher on the plate or cylinder as this is a subtractive process. On the plastic sheet, the lens area 14 will be below the surface of the flat gravure engraved portions of the sheet. The gravure engraving machine can also apply register marks or bands needed for printing and later operations.

According to another exemplary embodiment, a method of manufacturing a lenticular sheet comprises the steps of producing a transparent sheet by engraving a desired lens pattern into a flat metal plate or into and over an entire cylinder wherein the surface metal of the plate or cylinder in which the pattern is engraved into is loosely bonded to the base thereof and can be removed to become an engraved metal shell. Thereafter, the engraved metal shell is cut to the desired shape and turned in the desired direction of which the lenses are to run on the final transparent patterned sheet. The metal shell is then fastened to the cylinder or plate to be used to produce the transparent patterned sheet. Thereafter, the lens pattern is transferred to a desired side of a flexible, transparent plastic sheet at a pre-selected area by using an extrusion nip when the sheet is formed or at an embossing nip with a preformed and heated plastic sheet, or by casting if made from an ultra violet light curing resin or with other curable resins.

The foregoing describes the theory, which allows the lenticular portion of this sheet to produce the desired effects. The smooth un-embossed clear portion of the lenticular sheet provides no visual effect by the production of this invention, but allows for the required reflectivity and the desired see through effect.

Figure 11:
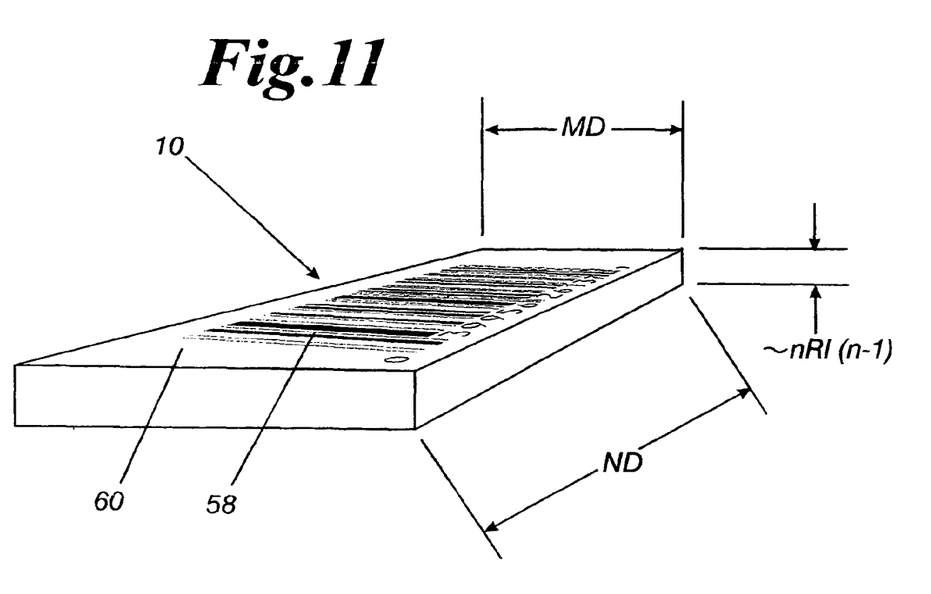
FIG. 11 is a sketch showing use of the product of this invention.

Referring to FIG. 11 is a surface view of a portion of the final engraved lenticular sheet the process of this invention, wherein lenses 14 are located in the desired portions of the sheet only. FIG. 11 is a surface view of a continuous web 60 showing pre-selected areas 58 that have a lenticular pattern. Lenticular designs are most often vertical in order to accommodate the physical scanning devices which are on a horizontal plane in order to achieve the before described effects allowed by lenticular lenses. However, it will be understood by those in the art that the present invention allows the lenticular design to be horizontal or diagonal in direction. The clear un-embossed portion of the web is shown by 60. Fine, easy to read print, bar codes and other information, which is not desirable to be printed under the lens portion, is found at 60. Clear and flat stripes are an aid to extruding the web in reducing stretch of the web as it is extruded. The stripes also allow a firmer roll to be wound up off the extruder.

The foregoing is a description of various embodiments of the invention that are provided here by way of example only. Although the method for producing the engraved scannable marking code has been described with reference to preferred embodiments and examples thereof, other embodiments and examples may perform similar functions and/or achieve similar results. All such equivalent embodiments and examples are within the spirit and scope of the present invention and are intended to be covered by the appended claims. Although specific terms are employed herein, they are used in a generic and descriptive sense only and not for purposes of limitation.

That which is claimed is:

1. A method of producing an engraved scannable barcode comprising the steps of:
   providing a substrate of transparent material having a first side and a second side and an index of refraction greater than one; and
   forming a lens array on the first side of the substrate in pre-selected areas thereof,
   wherein the lens array includes a lens pattern that is a barcode operable for being read by a barcode reading apparatus.

2. The method of claim 1, wherein the step of forming the lens array in pre-selected areas further comprises the steps of:
   creating as cutting tool;
   engraving a plate or cylinder with cutting tool to form an inverse lens pattern in pre-selected areas;
   using the engraved plate or cylinder in an extrusion embossment process such that the substrate can be embossed with the lens pattern.

3. The method of claim 2, wherein the step of engraving the plate or cylinder further comprises the steps of:
   utilizing a computer to control and direct the direction and depth of the engraved lens pattern.

4. The method of claim 1, wherein the step of forming the lens array in pre-selected areas further comprises the steps of:
   engraving a plate or cylinder with a desired lens pattern;
   masking desired portions of the engraved plate or cylinder;
   electroplating the plate or cylinder with a metal;
   cutting back the electroplated metal to a desired level; and
   removing the masking from the desired lens pattern; and
   using the resulting plate or cylinder in an extrusion embossment process such that the substrate can be embossed with the remaining lens pattern.

5. The method of claim 1, wherein the step of forming the lens array in pre-selected areas further comprises the steps of:
   engraving a plate or cylinder with a desired lens pattern;

removing undesired portions of the lens pattern from the plate or cylinder using a gravure engraving process; and using the resulting plate or cylinder in an extrusion embossment process such that the substrate can be embossed with the remaining lens pattern.

6. The method of claim 1, wherein the lens array comprises two or more different types of barcode lens patterns.

7. The method of claim 1, wherein said substrate can be produced from any clear plastic sheet consisting of polyester, polycarbonate, acrylic, polyolefin, polyvinyl chloride or any energy cured thermo set resin.

8. The method of claim 4, wherein the electroplating is cut to a level higher than a selected lens area to provide a thinner plastic sheet in the smooth areas.

9. The method of claim 4, wherein the electroplating is cut to a level lower than a selected lens area to give a thicker plastic sheet in the smooth areas.

10. A method of producing an engraved barcode comprising the steps of:

providing a substrate of transparent material having an index of refraction greater than one; and engraving a plate or cylinder with an inverse lens pattern and spaces in a alternating sequence along pre-selected areas such that the lens pattern and spaces form a desired barcode pattern; and using the engraved plate or cylinder in an extrusion embossment process such that the substrate can be embossed with the lens pattern and alternating spaces, wherein the lens pattern and alternating spaces on the substrate form a lens pattern that is a barcode operable for being read by a barcode reading apparatus.

11. The method of claim 10, wherein the lens pattern is selected from the group consisting of lenticular, lineal fresnel, dot or prismatic.

12. A method of producing an engraved scannable barcode comprising the steps of:

providing a substrate of transparent material; and forming a barcode pattern on a side of the substrate, wherein the barcode pattern comprises a plurality of lenses and spaces positioned in an alternating sequence such that the barcode pattern can be read by a conventional barcode scanning mechanism.

13. The method of claim 12, wherein the plurality of lens is formed by the steps of: creating as cutting tool;

engraving a plate or cylinder with cutting tool to form an inverse lens pattern in pre-selected areas;

using the engraved plate or cylinder in an extrusion embossment process such that the substrate can be embossed with the lens pattern.

14. The method of claim 13, wherein the step of engraving the plate or cylinder further comprises the steps of:

utilizing a computer to control and direct the direction and depth of the engraved lens pattern.

15. The method of claim 12, wherein the plurality of lens is formed by the steps of:

engraving a plate or cylinder with a desired lens pattern;

masking desired portions of the engraved plate or cylinder;

electroplating the plate or cylinder with a metal; cutting back the electroplated metal to a desired level; and removing the masking from the desired lens pattern; and using the resulting plate or cylinder in an extrusion embossment process such that the substrate can be embossed with the remaining lens pattern.

16. The method of claim 12, wherein the plurality of lens is formed by the steps of:

engraving a plate or cylinder with a desired lens pattern;

removing undesired portions of the lens pattern from the plate or cylinder using a gravure engraving process; and using the resulting plate or cylinder in an extrusion embossment process such that the substrate can be embossed with the remaining lens pattern.

17. The method of claim 12, wherein the plurality of lenses and spaces forms two or more different types of barcode lens patterns.

18. The method of claim 12, wherein said substrate can be produced from any clear plastic sheet consisting of polyester, polycarbonate, acrylic, polyolefin, polyvinyl chloride or any energy cured thermo set resin.

19. The method of claim 15, wherein the electroplating is cut to a level higher than a selected lens area to provide a thinner plastic sheet in the smooth areas.

20. The method of claim 15, wherein the electroplating is cut to a level lower than a selected lens area to give a thicker plastic sheet in the smooth areas.

* * * * *